United States Patent
Goetz et al.

(10) Patent No.: US 8,405,690 B2
(45) Date of Patent: Mar. 26, 2013

(54) OPTICALLY ADDRESSED GRAY SCALE ELECTRIC CHARGE-ACCUMULATING SPATIAL LIGHT MODULATOR

(75) Inventors: Howard V. Goetz, Tigard, OR (US); James L. Sanford, Camas, WA (US); Jonathan A. Sachs, Vancouver, WA (US)

(73) Assignee: Compound Photonics Limited, London (GB)

( * ) Notice: Subject to any disclaimer, the term of this patent is extended or adjusted under 35 U.S.C. 154(b) by 910 days.

(21) Appl. No.: 11/809,416

(22) Filed: Jun. 1, 2007

(65) Prior Publication Data

US 2009/0015530 A1    Jan. 15, 2009

Related U.S. Application Data

(60) Provisional application No. 60/803,747, filed on Jun. 2, 2006.

(51) Int. Cl.
G09G 5/10 (2006.01)
G09G 3/36 (2006.01)
G09G 5/02 (2006.01)
G02F 1/03 (2006.01)
G02F 1/00 (2006.01)
G02F 1/1335 (2006.01)
H03K 7/08 (2006.01)

(52) U.S. Cl. ............ 345/691; 345/89; 345/99; 345/694; 359/242; 359/245; 359/264; 348/751; 349/5; 332/109

(58) Field of Classification Search .................... 345/81, 345/87–104, 204, 690–694; 359/237–246, 359/259, 264, 276, 290; 348/750–751, 756–758; 348/771; 349/5, 17, 61; 332/106, 108–109; 353/34, 37
See application file for complete search history.

(56) References Cited

U.S. PATENT DOCUMENTS

| 5,140,448 | A |   | 8/1992  | Bone et al.                  |
|-----------|---|---|---------|------------------------------|
| 5,178,445 | A |   | 1/1993  | Moddel et al. ......... 359/85 |
| 5,309,262 | A | * | 5/1994  | Haas ................... 349/29 |
| 5,323,472 | A | * | 6/1994  | Falk ................... 382/103 |
| 5,917,568 | A |   | 6/1999  | Johnson et al. ........ 349/116 |
| 6,008,929 | A |   | 12/1999 | Akimoto et al.              |
| 6,072,452 | A |   | 6/2000  | Worley, III et al. ...... 345/89 |
| 6,232,963 | B1 | * | 5/2001 | Tew et al. ............ 345/204 |

(Continued)

FOREIGN PATENT DOCUMENTS

CN    1150503 C    3/1999
JP    06-138437   5/1994

OTHER PUBLICATIONS

Supplemental European Search Report for European Application No. 07 79 5612, dated Jul. 22, 2010, 6 pgs.

*Primary Examiner* — Bipin Shalwala
*Assistant Examiner* — Keith Crawley
(74) *Attorney, Agent, or Firm* — McKenna Long & Aldridge LLP

(57) ABSTRACT

A technique for modulating light by an optically addressed, electric charge accumulating spatial light modulator achieves substantially monotonic gray scale response. Embodiments digitally modulate the voltage across a photoreceptive material included in the spatial light modulator. The digital modulation scheme entails illuminating the photoreceptor with a series of light pulses propagating from an LCoS, in which the durations of the light pulses and their positions in time combine to produce binary-weighted equivalent rms voltages on the photoreceptor. The light pulses originate from a light-emitting diode or other switchable light source, and the timing of the light pulses is controlled such that they are emitted only when the associated LCoS is in a stable state. Emitting light pulses while the LCoS is in a stable state avoids non-monotonic behavior.

33 Claims, 12 Drawing Sheets

U.S. PATENT DOCUMENTS

| | | | |
|---|---|---|---|
| 6,437,919 B1 * | 8/2002 | Brown et al. | 359/621 |
| 6,753,990 B1 * | 6/2004 | Payne et al. | 359/22 |
| 6,795,064 B2 | 9/2004 | Walker et al. | 345/204 |
| 6,927,748 B2 | 8/2005 | Hughes et al. | |
| 6,995,917 B1 * | 2/2006 | Sampsell et al. | 359/634 |
| 7,440,157 B2 * | 10/2008 | Woodall et al. | 359/245 |
| 7,515,326 B2 * | 4/2009 | Selbrede et al. | 359/290 |
| 2003/0081304 A1 * | 5/2003 | Harada et al. | 359/294 |
| 2004/0178849 A1 * | 9/2004 | Kimura | 330/253 |
| 2004/0196524 A1 * | 10/2004 | Hughes et al. | 359/244 |
| 2007/0195329 A1 * | 8/2007 | Guthals et al. | 356/457 |
| 2007/0201006 A1 * | 8/2007 | Amano et al. | 353/31 |

* cited by examiner

OPTICALLY ADDRESSED GRAY SCALE ELECTRIC CHARGE-ACCUMULATING SPATIAL LIGHT MODULATOR

CROSS REFERENCE TO PRIORITY AND RELATED APPLICATIONS

This application claims priority to Provisional U.S. Patent Application No. 60/803,747, filed on Jun. 2, 2006, which is hereby incorporated by reference in its entirety. The subject matter of this application is related to commonly assigned U.S. patent application Ser. No. 11/569,498, filed Nov. 21, 2006, which is also incorporated by reference.

TECHNICAL FIELD

The present disclosure relates to modulation of light by spatial light modulators and, in particular, to a technique for modulating light by an optically addressed, photo-generated electric charge accumulating spatial light modulator to achieve substantially monotonic gray scale response.

BACKGROUND

Spatial modulation of the light beams entails the changing of light beam properties such as, for example, intensity or polarization of the light wave. A well-known example of a spatial light modulator (SLM) is an active matrix liquid crystal display (AMLCD) operating in an image projection system, which transforms image data in an electronic medium into a visible image on a display. In the AMLCD electronic circuitry that is integrated into the display applies for each frame a two dimensional array of voltages across a layer of liquid crystal material which induce a two dimensional array of changes in its optical properties and thereby to spatially modulate the light passing through or reflecting back through the liquid crystal. Gray scale control of these displays entails modulating the individual pixel voltages, typically by analog modulation or binary digital modulation.

Analog modulation methods were commonly used with earlier liquid crystal microdisplays, but they are poorly suited to very high-information-content displays. This is so because the small pixel size and consequent difficulty of storing accurate analog voltages often result in poor device yield and display pixel non-uniformity. Therefore, the microdisplay industry increasingly uses digital modulation methods.

Digital modulation methods usually take the form of either pulse width modulation (PWM) or duty factor modulation (DFM). PWM schemes entail applying to the liquid crystal microdisplay a voltage pulse that is of fixed amplitude and variable temporal width (i.e., duration). The variable width typically ranges from zero to the entire frame duration, corresponding to gray levels from zero to full-scale. Ideally, DFM has the same net integrated duration as does PWM, but it uses one or more pulses of fixed scaled duration to achieve this. For example, the most significant bit through the least significant bit pulses, each binary weighted, can be sequentially presented one after the other from the beginning of the frame period to the end of the frame period. For six bit data having a 101010 pattern, there would be three separate pulses of different durations. As those practiced in the art know, the liquid crystal directors respond to the root-mean-square RMS value of the applied voltage averaged over the response time of the liquid crystal. PWM schemes can produce excellent gray scale results and are inherently monotonic because in all cases larger gray scale values map directly to longer duration values of a single pulse, which in turn always gives larger RMS values of the applied voltage. PWM schemes also minimize rise and fall time effects in the LC. However, they are very complex to implement in actual displays because of the timing positions of the lowest order bit with the frame period. For example, with 10 bit data, the LSB bit can be positioned in 512 different time locations within the frame period. The display system must be able to accommodate this timing resolution. Alternative methods of achieving PWM can reduce pixel circuit complexity at the expense of extremely high data rate requirements. However, in practice, PWM schemes are generally too difficult or expensive for use in liquid crystal microdisplays and are not widely encountered.

DFM schemes are the most widely used form of digital modulation of liquid crystal microdisplays. In DFM, as in PWM, fixed-amplitude voltage pulses are applied to the microdisplay. However, in DFM there is one voltage pulse for each '1' in the data packet, depending on the particular gray level to be displayed. In DFM, the total additive durations of the pulses divided by the total frame time determines the duty factor of the voltage, and thus its equivalent rms value. The problems with this scheme for the case of an optically addressed liquid crystal spatial light modulator is that it does not take into account the finite rise and fall times of the liquid crystal material (particularly of the fact that they are often different from each other). Nor does it account for the differing times at which light pulses for differing bits within the bit planes for each frame from the write valve reach the read valve's photo-generating device (so that they affect the read for differing periods of time). Thus, relative binary weighted pulse positioning of the write valve may result in a non-monotonic optical response of the read valve. (The optical response for 100 could be less than for 011.) Put another way, the actual optical response may differ from the theoretical duty factor calculated from the voltage pulses alone. This error depends on the number of sets of rising and falling edges, and thus the number of pulses, which error changes drastically as a function of the desired gray scale level. The result is that DFM schemes generally produce non monotonic results at a number of gray levels. This is a serious problem for marketing. A number of schemes have been developed to attempt to correct non-monotonicity, but none of them is fully satisfactory, and most of them require substantial increases in cost, complexity, or reduction in data rate.

An OASLM can operate in either transmission or reflection mode. FIG. 1 is a diagram of a currently available reflective OASLM 10, which includes an electro-optic material (e.g., liquid crystal) layer 12 and a photoreceptive layer 14 formed usually of semiconductor material. The semiconductor materials in this example were selected from a variety of materials absorbing light in the visible wavelength range (400 nm-700 nm), for example, amorphous silicon, amorphous silicon carbide, single crystal $Bi_{12}SiO_{20}$, silicon, GaAs, ZnS, and CdS. Liquid crystal layer 12 and photosensitive layer 14 are positioned between optically transparent electrodes 16 and 18 supported on respective substrates 20 and 22. The visible output light (read light) is reflected off a dielectric mirror 24. In the transmission mode, both the write light and the read light passes through substrate 20 and there is no dielectric mirror 24 and the photoreceptive layer 14 must absorb the write light and pass the read light.

For projection schemes, OASLM structures are addressed with an optical signal or image. FIG. 2 is a diagram of a currently available projection system 30, in which input images are formed, for example, as cathode-luminescent patterns on the screen of a cathode-ray tube (CRT) 32 and then are transferred onto the photoreceptive layer of OASLM 10 by optical components that include optical fiber plates, optical lenses, or both. More specifically, CRT 32 operates as an input image source producing an input image that is transferred through a lens 34 onto the photoreceptive layer of the OASLM 10. The photoreceptive process carried out in OASLM 10 leads to spatial changes of light reflection (or light transmission in a transmission mode of operation) of the electro-optical material (e.g., liquid crystal) layer of the OASLM 10. The S polarized component of the read light emitted by an arc lamp 38 propagates through a condenser lens 40 and is reflected by polarizing beam splitter 36 for incidence on the OASLM 10, where it is modulated spatially in real time, reflected back through the polarizing beam splitter 36 and finally projected onto the screen by a projection lens 42. (The P polarized component of the read light propagates through condenser lens 40 and passes straight through the polarizing beam splitter 36 and is lost.) In this case, the optical signal propagating from the CRT 32 to the OASLM 10 is essentially of analog character. As a CRT pixel region is addressed, the CRT beam current is adjusted to control the pixel brightness. The pixel phosphor is excited by the electron beam intensity corresponding to the CRT beam current to produce light. The persistence of the phosphor after the dwell time on each pixel controls the duration of the pixel light. Correspondingly, the CRT image or the write light is incident on the OASLM 10 so that it changes the output of the OASLM 10 in the form of light reflection (or transmission) changes. Due to the raster scan nature in which CRT images are formed, the voltage signal that is applied to the transparent electrodes 16 and 18 changes polarity many thousands of time per second.

Forming images with a CRT suffers from many disadvantages, including a high degree of amplitude and geometrical nonlinearities, occupying a large volume and footprint, and operating at a high voltage.

SUMMARY

In accordance with one exemplary embodiment is provided a method of optically writing to a read light valve. In the method, the following actions are taken during a frame. A selected write cell voltage is applied at a pixel location of an optical write valve; after the pixel location is at an optically stable state, the pixel location is illuminated with a modulated light source pulse so as to emit from the pixel location a write light pulse; and the write light pulse is directed to a localized portion of an electro-optic layer of an optical read light valve. Still within the frame, the above elements of applying, illuminating and directing are sequentially repeated for a plurality of selected write cell voltages and modulated light source pulses.

In accordance with another exemplary embodiment is provided an optical write valve that includes an electro-optic layer, a backplane defining pixel locations of the electro-optic layer, a light source arranged in optical communication with the electro-optical layer, and a controller coupled to a memory. The controller is adapted during a frame to sequentially and discontinuously apply a plurality of selected write cell voltages at a pixel location of an optical write valve, and after the pixel location achieves an optically stable state for each of the applied write cell voltages, to modulate the light source in accordance with the times at which the selected write cell voltages are applied.

In accordance with another exemplary embodiment is provided a computer program embodied on a memory. The computer program includes computer readable instructions to perform actions directed toward emitting optical write light, and those actions include, within a frame: applying a selected write cell voltage at a pixel location of an optical write valve; after the pixel location achieves an optically stable state, illuminating the pixel location with a modulated light source pulse so as to emit from the pixel location a write light pulse; directing the write light pulse to a localized portion of an electro-optic layer of an optical read light valve; and sequentially repeating the applying, illuminating and directing for a plurality of selected write cell voltages and modulated light source pulses.

These and other aspects of the invention are detailed below with particularity.

DETAILED DESCRIPTION

Embodiments digitally modulate the electro optical elements in write valve SLM with a frequency corresponding to the product of the read valve OASLM frame, the number of gray scale bits for each read valve OASLM image and the number read valve OASLMs addressed by the write valve spatial light modulator. Also, an alternating polarity voltage square wave signal is applied across the photoreceptor layer and liquid crystal layer sandwich of the read valve OASLM with frequency, about 100 times per second, of the output of the readout. The ratio of capacitance per unit area of the photoreceptor and of the liquid crystal determines the ratio of the voltage signal developed cross each layer of the read valve. The initial voltage across the liquid crystal is set low enough for an off state (normally black OASLM operation). Every voltage signal polarity change at the read valve corresponds to a new OASLM frame period. Depending upon the specific materials used, the photoreceptor may operate by photo-induced charge separation or by photo-induced ohmic conductivity (e.g., cadmium sulfide CdS).

Figure 1:
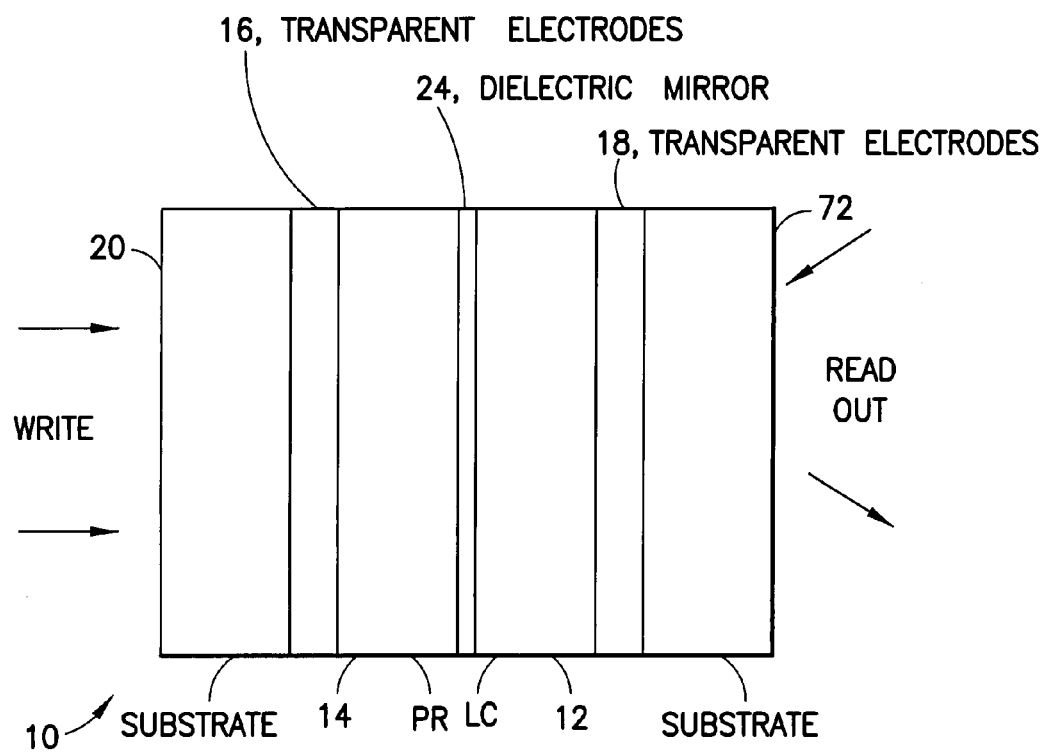
FIG. 1 is a diagram of a prior art optically addressed spatial light modulator that includes an electro-optic material layer and a photosensitive semiconductor material layer.
Figure 2:
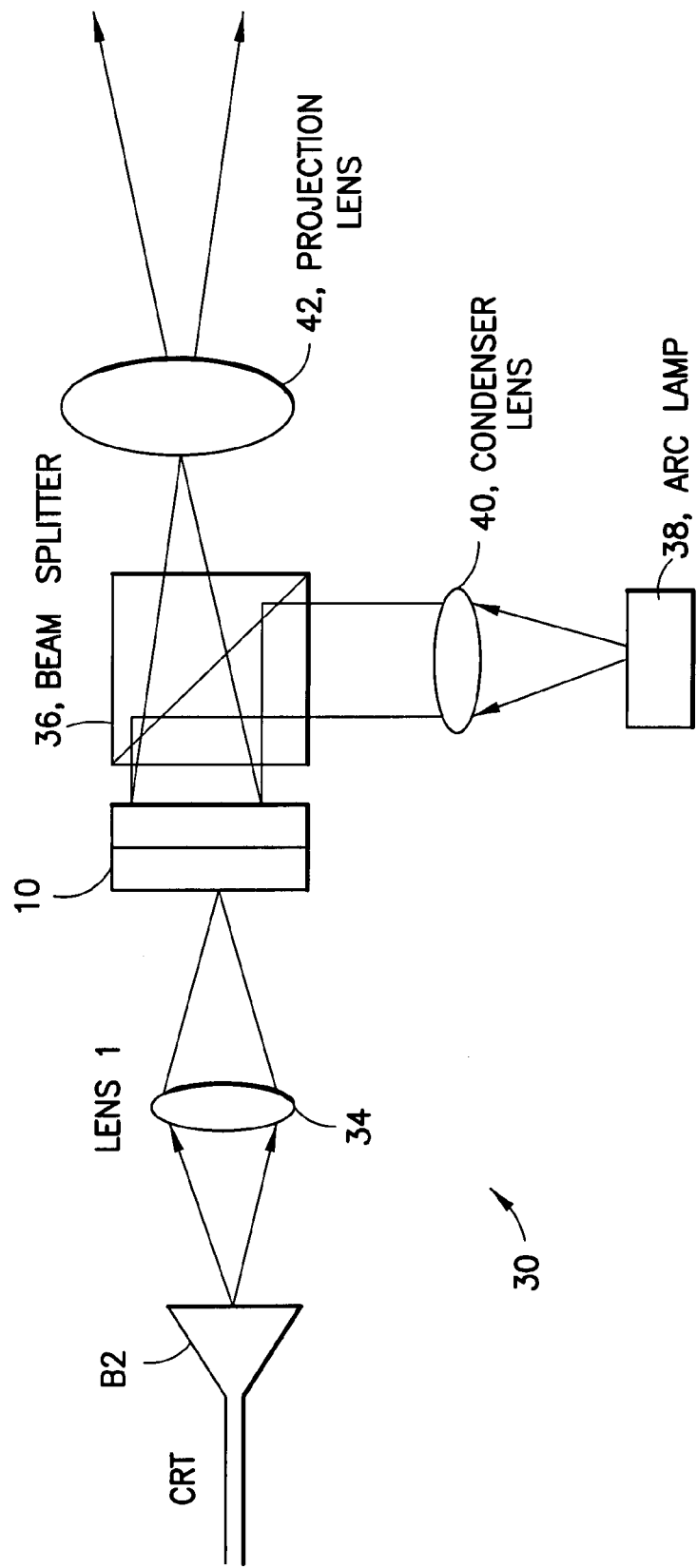
FIG. 2 is a diagram of a prior art projection system composed of a cathode-ray tube optically associated with an optically addressed spatial light modulator.

Embodiments of this invention are an alternative approach over the prior art to spatial light modulation for optically addressed spatial light modulators OASLMs or light valves. For an OASLM, local changes in optical properties of the liquid crystal material of the output device, i.e. the read valve, are induced by an input optical signal from a write valve. Modern image source devices such as LED arrays, liquid crystal arrays (including liquid-crystal-on-silicon (LCOS)), polysilicon, and other thin-film transistor devices, do not suffer from most of the drawbacks noted above for a CRT write source (FIG. 2). They operate at low voltages, occupy small spaces, and exhibit high geometric linearity. However, they still have features that prevent them from being used as an analog image source in a configuration similar to that shown in FIG. 2. For example, an LED array may be limited in brightness, in array size, in resolution or require moving parts. The LCOS is perhaps best suited as a small digital device that can operate in pulse-width modulation mode to create gray scale response. Note however that the LCoS implementation detailed below is an exemplary embodiment of the invention and not a limitation thereto.

During an OASLM frame, localized incident light of the appropriate wavelength on the photoreceptive layer produces a charge separation which locally increases the voltage across the liquid crystal. Due to the effect of localized charge separation in the photoreceptor upon a voltage across it and liquid crystal, the two dimensional array of write light for each grey scale data plane is converted into a two dimensional array of increments in the liquid crystal voltage which accumulates over each OASLM frame period. As the polarity of the OASLM voltage signal is changed, the liquid crystal voltage is initialized and a new light integration period is started. One method to initialize the liquid crystal voltage in between polarity changes is to set the OASLM voltage signal to zero volts and illuminate the photoreceptor with the write light for discharging both photoreceptor voltage and liquid crystal voltage.

The digital modulation scheme used here entails illuminating the photoreceptor with a series of pulsed light images propagating from a write valve, in which the durations or the intensities of the pulsed light images and their positions in the frame period combine, when properly adjusted as taught herein, to produce monotonic voltages across the liquid crystal. The write light originates from a light emitting diode (LED) or other amplitude controlled or switched light source. If the write light source is switched on and off, then the timing of the write light pulses is controlled such that they are emitted only when the associated write valve is in an optical stable state. If the write light source is amplitude controlled but never turned off, then the write light amplitude is controlled to produce an essentially equivalent result. Both methods produce a train of pulsed light images, one for each grey scale in each frame. The scheme is low in cost and efficient in data bandwidth. Therefore, it is well-suited for use with spatial light modulators.

The gray scale addressing scheme entails operation of a OASLM in a charge accumulation regime for each frame with the train of grey scale bit image applied voltage pulses such that the sum of durations for each frame does riot exceed a maximum accumulation time of the photoreceptor, which depends on the parameters of the structure. To achieve proper gray scale modulation with one write valve that must sequentially write each of the gray scale bit planes, it is necessary to space these writing processes in time sufficiently that the write valve liquid crystal can reach its stable state (given the voltage written to it) before it receives the pulse of write light from the light source.

This is conveniently done in one embodiment by devoting equal periods to each bit from the most significant bit (MSB) to the least significant bit (LSB) in each gray scale data packet. For example, for 10 bits of gray scale, the duration for each gray scale bit frame might be 1 ms for a 10 ms frame period. Then, the input pulsed light images are shifted with respect to the leading edge of the read valve OASLM applied voltage signal, and the multiplicity of input pulsed light images are shifted in time relative to each other. Each pulse of write light can be adjusted to a difference in duration within the 1 ms period for the gray scale bit plane, or adjusted to a different intensity, or both duration and intensity can be adjusted to provide the proper gray scale effect, as taught herein.

An embodiment system using OASLMs includes three read valves, one each of three colors (red, green, and blue) of read light. The photoreceptor in each read valve determines the two dimensional array of the fractions of the total OASLM read valve voltage signal developed across the multiplicity of pixels in the read valve liquid crystal material. This array of voltage levels developed across the liquid crystal result from time integration of the photocurrent produced in response to each gray scale bit plane of illumination that, in an embodiment, is determined by a liquid crystal on silicon (LCOS) microdisplay illuminated by a train of gray scale pulses from the write light source (e.g., an ultraviolet UV LED, or other suitable wavelength source outside the UV band).

A sequence of pulsed light images controlling the amount of light incident on the read valve achieves the desired modulation range (i.e., gray scale) capability of the read valve when the intensity and duration of the write light pulses is adjusted as taught herein. In the case of the OASLM system, the pulsed light images or the write light propagates from the LCOS microdisplay (i.e. write valve), which modulates the output from a UV LED or other light source of suitable wavelength.

Thus the problem of controlling the transmission characteristics of the OASLM read valves reduces to the problem of modulating the light output from the write valve. The same considerations discussed above with respect to the applicability of analog, digital PWM, or digital DFM modulation methods apply to OASLM as well. However, the problem of modulating the output of the write valve has additional complexities. In particular, the UV illumination source also needs to be controlled, and the integrating characteristics of the OASLM need to be taken into account in designing the modulation scheme. The present embodiments accomplish this goal without adding significant cost or complexity to the system and, moreover, takes advantage of some of the unique characteristics of the OASLM.

Figure 3:
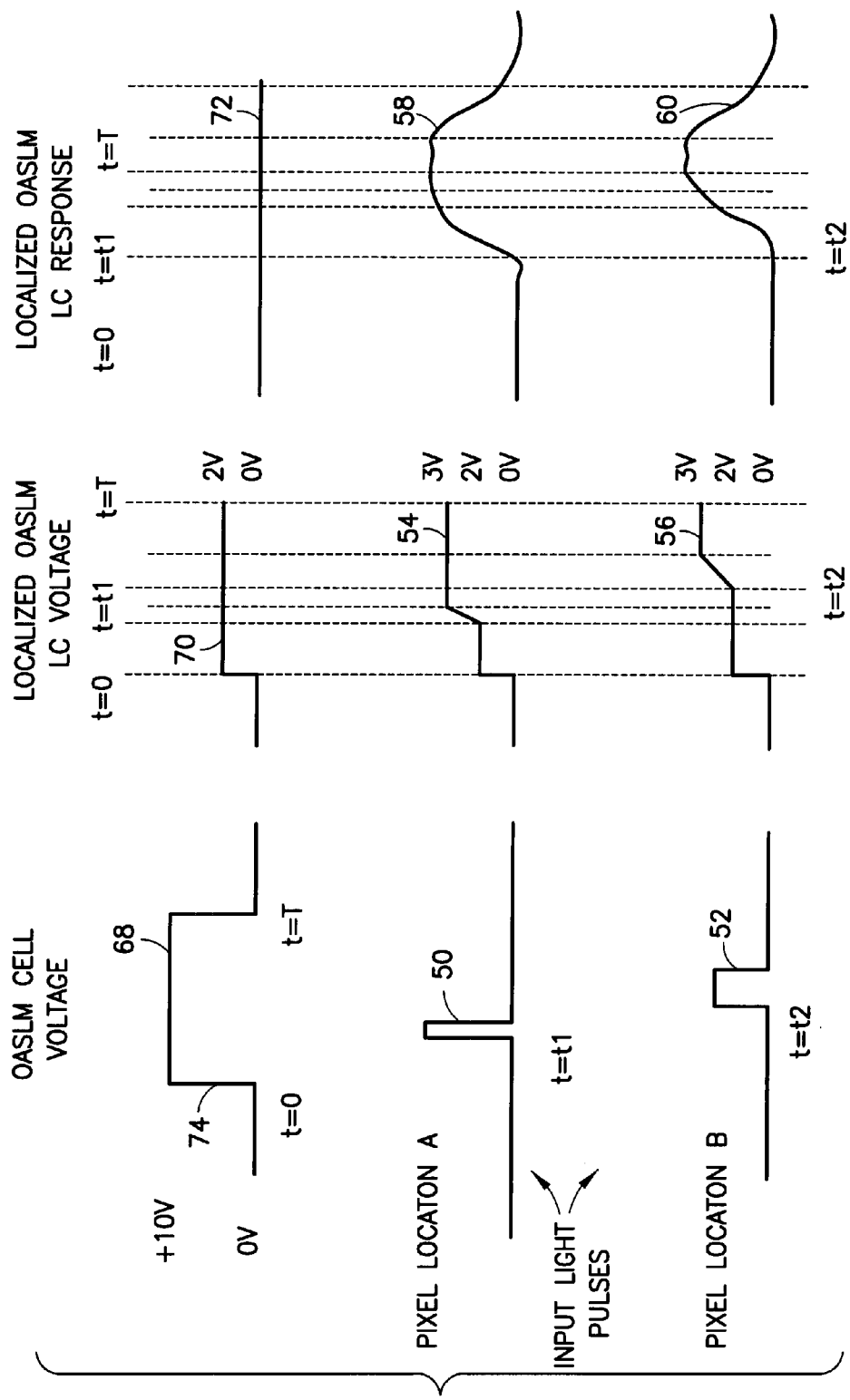
FIG. 3 is a set of timing diagrams showing modulation characteristics of a spatial light modulator working in a charge accumulating mode and addressed with different amplitude and different pulse width optical pulses, each illuminating different locations of the read valve spatial light modulator.
Figure 4:
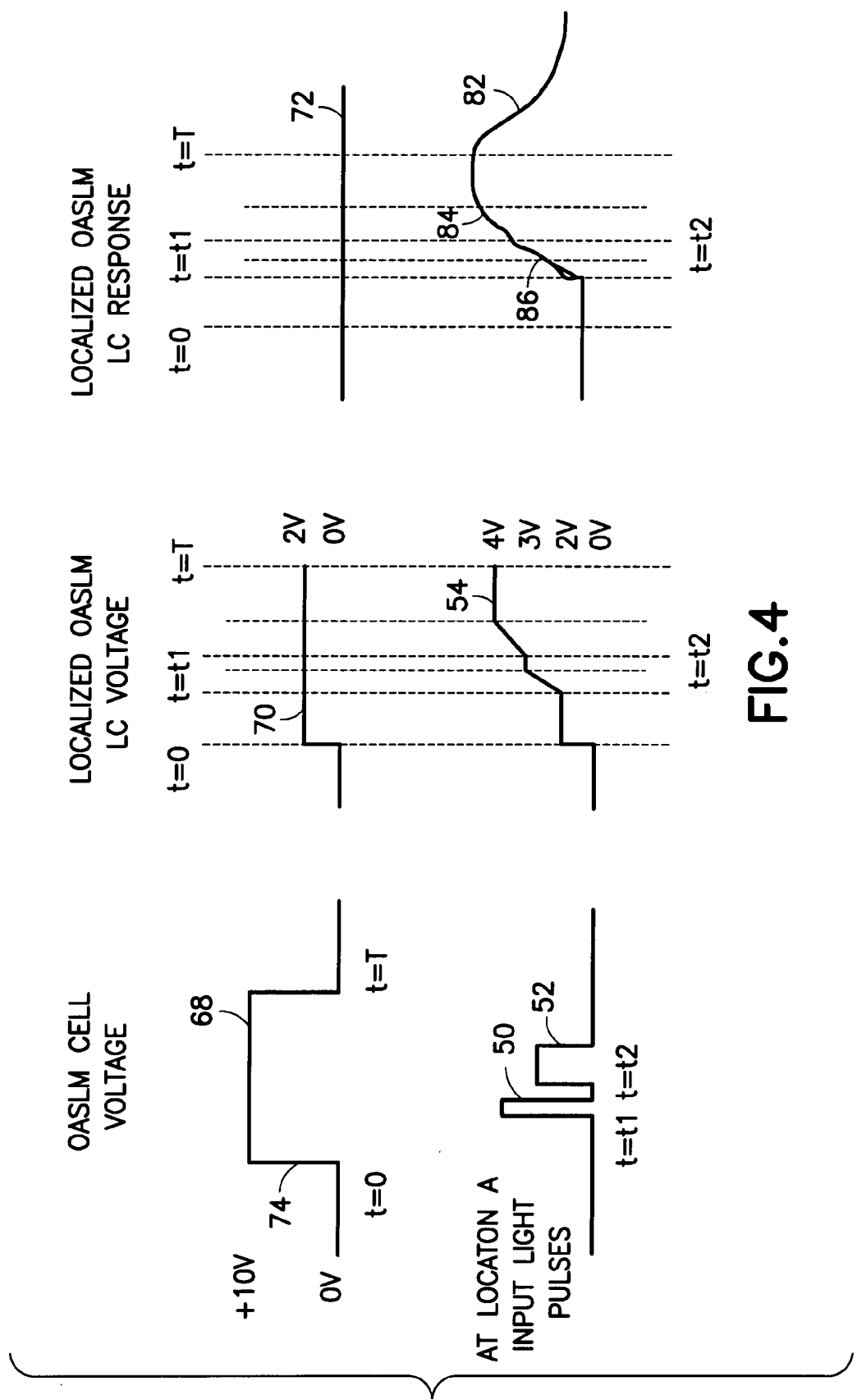
FIG. 4 is similar to FIG. 3, but where the two addressing pulses are integrated together at the same location of the spatial light modulator.

The principles of operation of the scheme of gray scale modulation using an OASLM structure working in the accumulation mode of the photo-generated electric charge are illustrated in FIGS. 3 and 4. FIG. 3 shows that light pulses 50 and 52 of the different duration and different amplitude/intensity result in respective step-like voltage increases 54 and 56 at different locations across the liquid crystal material. Due to the different start times t1 and t2 and liquid crystal rise and fall times, the incidences of light pulses 50 and 52 lead to different liquid crystal optical responses 58 and 60, respectively. A relatively fast liquid crystal response is shown for visualization purposes. To implement the embodiments, it is not necessary that the read valve liquid response be fast. A voltage signal 68 applied to the read valve OASLM working in a charge accumulation region produces a step-like voltage increase 70 and a liquid crystal optical response 72.

In FIG. 3 the read valve corresponding to different pixels, a and b, of two input light pulses corresponding the 1's of different bits of the gray scale arrive at different locations of the OASLM at moments of time shifted with respect to the leading edge 74 of applied voltage signal 68. The light pulses 50 and 52 as illustrated have the different duration and different intensity, in practice, either the duration or intensity or both duration and intensity of one the pulses relative to the others may be adjusted to provide the appropriate bit weight.

FIG. 4 illustrates the combination of light pulses 50 and 52 that arrive at different moments corresponding to 1's in different bits in the gray scale data packet for the same pixel. The combination of light pulses 50 and 52 produces a gray scale response 82 that is a result of the different charge accumulation in the OASLM. This accumulation is affected by both the arrival of these pulses at different moments in time, and by the total number of write light photons in each gray scale pulse that arrives at each read valve pixel region. In particular, the contribution 84 associated with second light pulse 52 to the overall gray scale response 82 is similar to the contribution 86 associated with first pulse 50 to the overall gray scale response 82. While the later pulse 52 is lower in amplitude than the earlier pulse 50, pulse 52 is wider than pulse 50 so that the net effect on the LC voltage 54 and the LC response 82 are not significantly different. This indicates clearly that modulation may be done by varying amplitude, pulse width, or as shown in FIG. 4 by varying a combination of both parameters of the pulse.

While the difference in resulting response for light pulses arriving at different times can be used to create gray scale response directly, light pulses arriving at different times can also have different energy values (resulting from different intensity values, widths, or both). Thus, light pulses having different energy values and arriving at different times during the accumulation period can have equal corresponding gray scale responses. Moreover, a larger gray scale response can be achieved for a second (later), higher energy light pulse as compared to that of a first (earlier), lower energy light pulse. The OASLM property of accumulating photo-generated electric charge allows the range of amplitudes or durations of the pulsed light images to be much smaller. For example, for 10 bit pixel data presented in even length time intervals over the frame period, and in which each light image pulse represents a bit plane of the data, the image amplitude or duration may vary over an approximately 40:1 range for a MSB bit to LSB bit weight range of 512:1.

In most current digital modulation schemes, the time period range difference between the MSB bits and LSB bits indirectly determines the system data bandwidth requirements. For conventional systems with 10 bits of resolution, the MSB to LSB time period difference is 512:1. The data bandwidth associated with this range difference can be difficult to manage. The charge accumulation or integration of the photo-generated charge together with use of pulsed light images can reduce the data bandwidth significantly. This is so because the ability to create pulsed light images effectively reduces the amount of time needed to create voltage change for each gray scale pulsed image from the time taken to write a bit plane. When the write valve images are being pulsed, electric charges are formed and the voltage across the OASLM liquid crystal changes (or integrates) to a new value that is proportional to the illumination level and width of the pulse. On the other hand, when there isn't any localized pulse light, the voltage on the photoreceptor remains constant.

Figure 5:
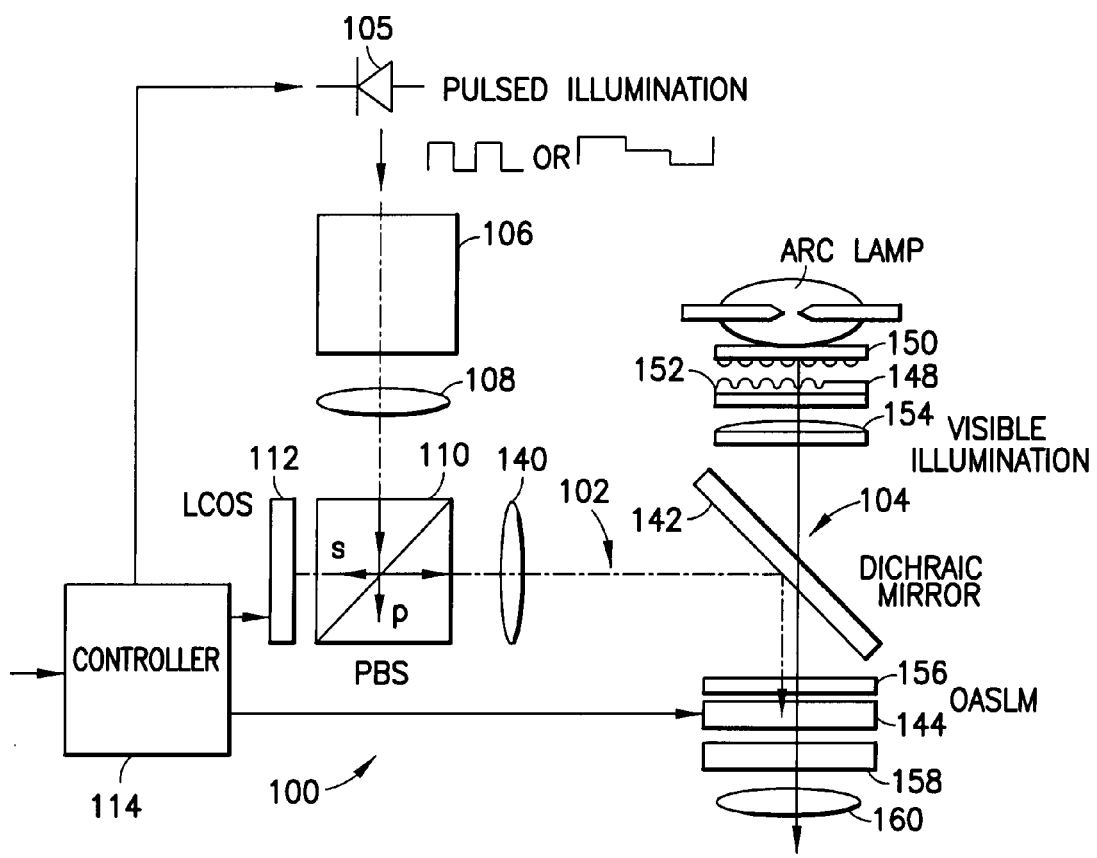
FIG. 5 is a simplified block diagram of an optically addressed spatial light modulator system in which digital modulation is carried out to achieve a light output characterized by substantially monotonic gray scale response.

FIG. 5 is a simplified block diagram of an OASLM system 100 in which digital modulation is carried out to achieve a light output characterized by substantially monotonic gray scale response. FIG. 5 shows specifically an embodiment using a transmission-mode OASLM, so the write light source and the photoreceptor operate at UV wavelengths to avoid interference from the read light. A reflective-mode OASLM may be employed using the same principles of FIG. 5 detailed below, at an appropriate wavelength band. OASLM system 100 defines a write optical path 102 and a read optical path 104. Write optical path 102 is composed of a segment along which propagates an image definition beam. A UV LED 105 provides a pulsed UV write light beam source. The pulsed UV beam emitted from UV LED 105 propagates through a tunnel integrator 106, a relay lens group 108, and a polarizing beamsplitter 110 to provide uniform, rectangular illumination that matches the image aspect ratio of an LCOS microdisplay device 112. The p-polarization of the illumination passes through the polarizing beam splitter 110. The s-polarization of the illumination is reflected by the polarizing beam splitter 110 onto the LCOS device 112. Light controlling signals are provided to UV LED 105 by a controller 114.

LCOS device 112 provides, in response to image data delivered to LCOS device 112 by controller 114, UV write light patterns for a selected color component of the primary colors (RGB). The modulated illumination reflected back from the LCOS device 112 propagates back into the polarizing beam splitter. The p polarization of the reflected modulated illumination passes through the polarizing beam splitter and it is imaged by an imaging lens 140 and reflects off a tilted dichroic mirror 142 for incidence on an OASLM 144. OASLM 144 is preferably of the type described in FIGS. 1-3, 4A and 4B of International Application No. PCT/US2005/018305. The modulated light incident on the photoreceptor layer of OASLM 144 develops a voltage across its liquid crystal layer. This voltage causes a director field orientation that corresponds to the integrated intensity of the associated incident UV write light beam. Controller 114 provides a voltage signal to OASLM 144 to enable it to develop the liquid crystal voltage in proper timing relationship with the incidence of the UV write light.

Read optical path 104 includes an arc lamp 146, which emits randomly polarized white light. The white light propagates through a polarization converter 148, formed as an integral part of an assembly of fly's-eye lenslet arrays 150 and 152, and thereafter through a focusing lens 154 and a linear polarizer 156 to provide linearly polarized light in the form of uniform, rectangular illumination that matches the image aspect ratio of read valve OASLM 144. Tilted dichroic mirror 142 separates the white light into the selected primary color light component and directs these through field lenses (not shown) to read valve OASLM 144. Depending on the image defined by the UV write light beam, the color light component is either transmitted through or absorbed by an analyzer 158 positioned in proximity to read valve OASLM 144, resulting in intensity modulation of the corresponding color image content. The modulated light beam propagating through read valve OASLM 144 is directed through a projection lens 160 to generate a color image for projection on a display screen (not shown).

Controller 114 coordinates the digital modulation of LCOS device 112 in accordance with the image plane data, the timing of pulsed light emissions from UV LED 105, and the analog modulation control of read valve OASLM 144 to produce visible analog modulated output illumination having a substantially monotonic gray scale response. The phrase 'substantially monotonic' is used to mean that there is or almost is a monotonic gray level response. With digital driving methods, 8 bit pixel data is used in a table lookup to create 10 bits of data. The additional 2 bits of data are used to account for various nonlinearities such as the nonlinear electro optic properties of liquid crystal. For example, it may be visually acceptable that the 10 bit data transfer function be monotonic for the 8 most significant bits.

In an OASLM, the voltage across the photoreceptor/liquid crystal assembly reverses polarity at the end of each frame. When voltage polarity reversal occurs, the integrated charge built up in the liquid crystal is neutralized, thereby eliminating the previous photo-induced voltage across the liquid crystal layer. Thus, liquid crystal voltage integration restarts from zero at the beginning of each frame. Voltages produced by the integration of charge in the photoreceptor influence, therefore, only the liquid crystal layer from the time they are produced until the end of the frame. Voltages produced early in the frame are effectively weighted more heavily than those produced near the end of the frame.

Figure 6:
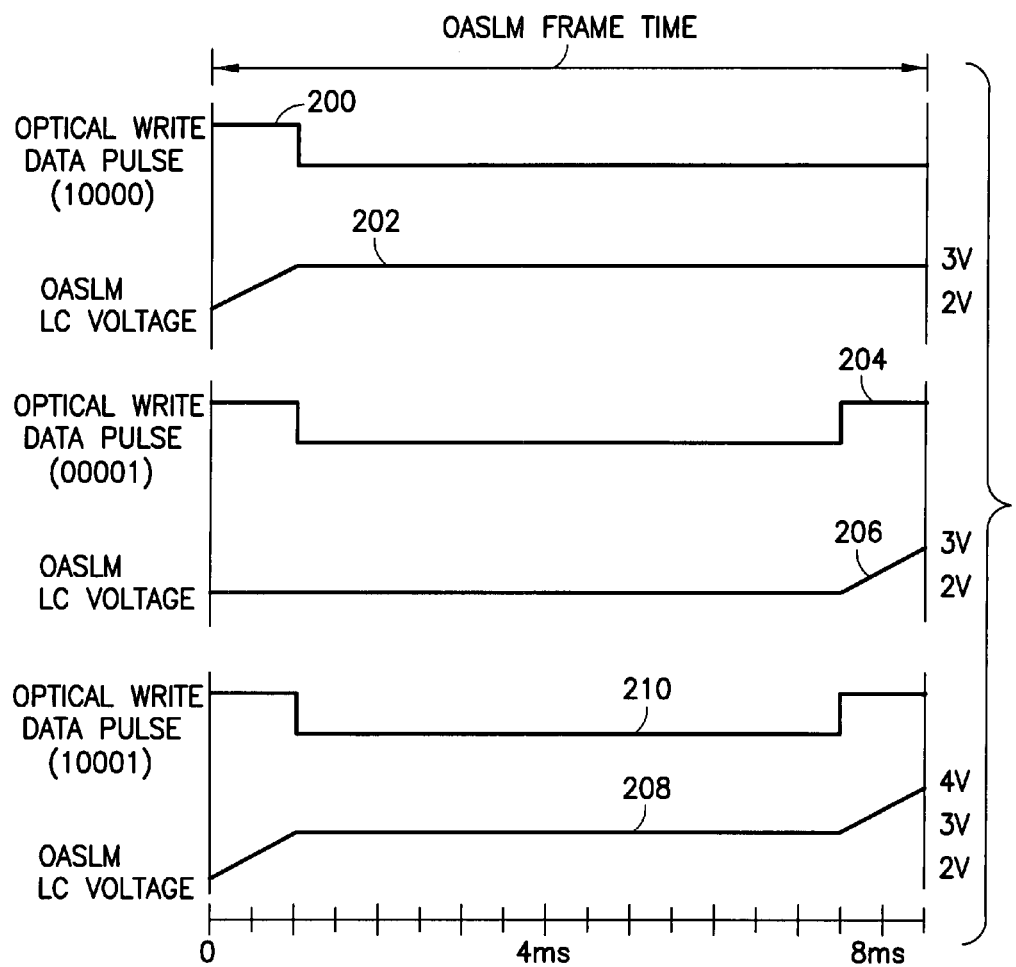
FIG. 6 is a set of graphs showing the results for local liquid crystal voltage integration in response to write pulses (10000), (00001) and (10001) patterned light pulses propagating from an LCOS device.

FIG. 6 is a set of graphs showing the results of photo-generated charge and liquid crystal voltage integration in response to LCOS light pulses. A write or illumination pulse 200 propagating from LCOS device 112 at the beginning of the read valve frame period produces a photo-generated charge which modifies the liquid crystal voltage resulting in a voltage level 202 that lasts most of the frame period. A write pulse 204 of the same duration and intensity as write pulse 200 but appearing at the end of the frame period produces the same liquid crystal voltage level 206 but has little duration. For the pulse widths shown for write pulse 200 and write pulse 204, the average incremental liquid crystal voltage difference can be 16:1. As such, waveforms 202, 206 and 208 corresponds to gray scale data packets of (10000), (00001) and (10001), respectively. Greater differences in read valve liquid crystal voltage can be obtained by reducing the write pulse widths relative to the frame time.

Voltage waveforms are additive, as indicated by the liquid crystal voltage level 208 for a write pulse 210 representing a combination of write pulses 200 and 204. The rms values of such voltage waveforms, in general, do not add. Since liquid crystal optical response is related to the rms voltage and if the resulting rms voltage waveforms are not additive, non monotonic behavior could conceivably result. The exceptions are direct current DC and a single frequency waveform, and harmonically related waveforms.

However, in practice, it appears that for situations in which most of illumination is concentrated into a relatively short period near the beginning of the frame period, errors resulting from adding the rms voltage values are not sufficiently large to lead to non-monotonic gray scale response. This approach approximates an amplitude modulated square wave voltage on the liquid crystal. One advantage for concentrating the light pulse near the beginning of the frame is that higher liquid crystal voltage is obtained due the integration properties of OASLM. Less illumination is required to achieve a given RMS voltage and a lower OASLM signal voltage may be applied which may allow improvements in photoreceptor characteristics.

The use of illumination data pulses for writing a read valve image assumes that LCOS liquid crystal material has reached a stable optical state (e.g., on or off) before the illumination pulse starts. This contributes to the switching speed requirements for the liquid crystal material. In particular, there must be sufficient time for ten or twenty write liquid crystal director settling intervals and sufficient time for ten LED pulses or intensity changes, respectively, in the frame time (for a 10-bit system). Providing that this requirement is met, any type of liquid crystal material should be applicable. For example, ferroelectric liquid crystal materials with 200 microsecond switching times using ±1.65V drive voltages at 50 degrees centigrade would be suitable. Narrow gap, vertically aligned nematic liquid crystal material with sufficiently fast switching times for color sequential operation are also available.

Although it is possible to use photoreceptor integration alone to achieve the correct binary weights, the LCOS data bandwidth would need to be unrealizably high because of the very fine time resolution needed to distinguish LSB gray levels. The method described below spreads out the data flow as evenly as possible over the frame period. The method can be accomplished by modulating the illumination pulse amplitude, pulse width, duty factor, or various combinations of them in proportion to the bit weights of a desired digitally encoded gray scale value.

Figure 7:
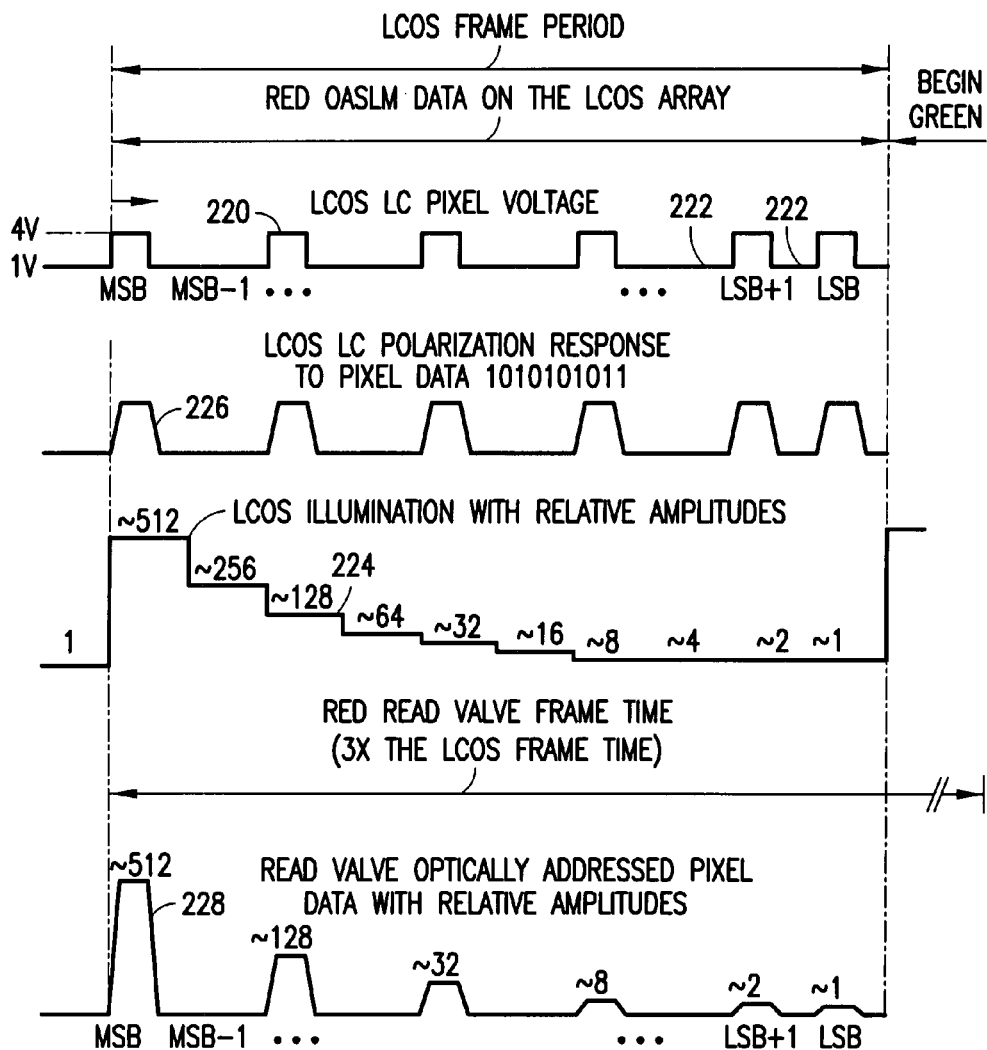
FIG. 7 shows an example in which data bits are spread out evenly over a frame time to reduce bandwidth requirements for an LCOS microdisplay device.

FIG. 7 shows an example in which the data bits are spread out evenly over a LCOS frame time to reduce the LCOS bandwidth requirements. The frame period is divided into twenty pixel voltage data periods 220, in which ten periods 222 are provided for turning off the pixel LCOS liquid crystal material. The LCOS illumination intensity 224 varies with the datum bit being presented to the LCOS microdisplay. The approximate relative illumination levels are as indicated in FIG. 7. The combination of bit position in the frame time and the illumination level provides the binary weight photoreceptor voltage levels. The illumination scheme shown in FIG. 7 is constant during each bit interval, overlapping the rise and fall of the liquid crystal material response 226 so that each bit is equally affected by the rise and fall times of the liquid crystal material, enabling this effect to be compensated for. The resulting illumination pattern produced by the LCOS for the pixel data bit sequence 1010101011 I shown as read valve optically addressed pixel data 228. Although the liquid crystal responses in FIG. 7 are shown as having trapezoidal shapes, in practice the rising and falling edges are S-shaped for ferroelectric liquid crystal materials or exhibit exponential decay for nematic liquid crystal materials. This is not an important distinction for this method since it just implies a different adjustment of the bit illumination intensities or durations on order to achieve the proper weighting.

Since the LCOS is operating in a color sequential mode, the LCOS must sequentially address each of the three read valves during each frame. This implies that the read valve frame length is three times that of the LCOS. In such a system, each of the three read valves frame periods is shifted by ⅓ frame from that of the preceding read valve. This allows the optically addressed pixel data pulses for each read valve to be located in the same part of that valve's frame period. In practice it is advantageous to arrange the relative timing such that optically addressed pixel data pulses for each read valve are located near the beginning of that read valve's frame period, to minimize the illumination required and to minimize the OASLM applied voltage. With the optically addressed pulses located early in the frame period, the amplitudes can be approximately binary weighted as there is less error induced in the rms value of the net read valve response by the OASLM integration of the weighted bit pulses.

The method depicted in FIG. 7 does even out the data bandwidth but does not reduce the bandwidth to a minimum in a frame time, as there are additional off data intervals required for operation. In addition, each data pulse loses effective illumination because of a rise and fall time response of the liquid crystal material. Furthermore, the illumination amplitude range may need to be changed over as much as a 512:1 range. Whether the illumination amplitude range is an issue depends on whether there is sufficient control and whether the illumination level can be switched quickly. LEDs or laser diodes are the most likely source for this kind of illumination. The LED can be high frequency modulated at about 200 times the frame rate. As an alternative to electronically sampling the illumination, the LCOS optical levels can be optically sampled.

Figure 8:
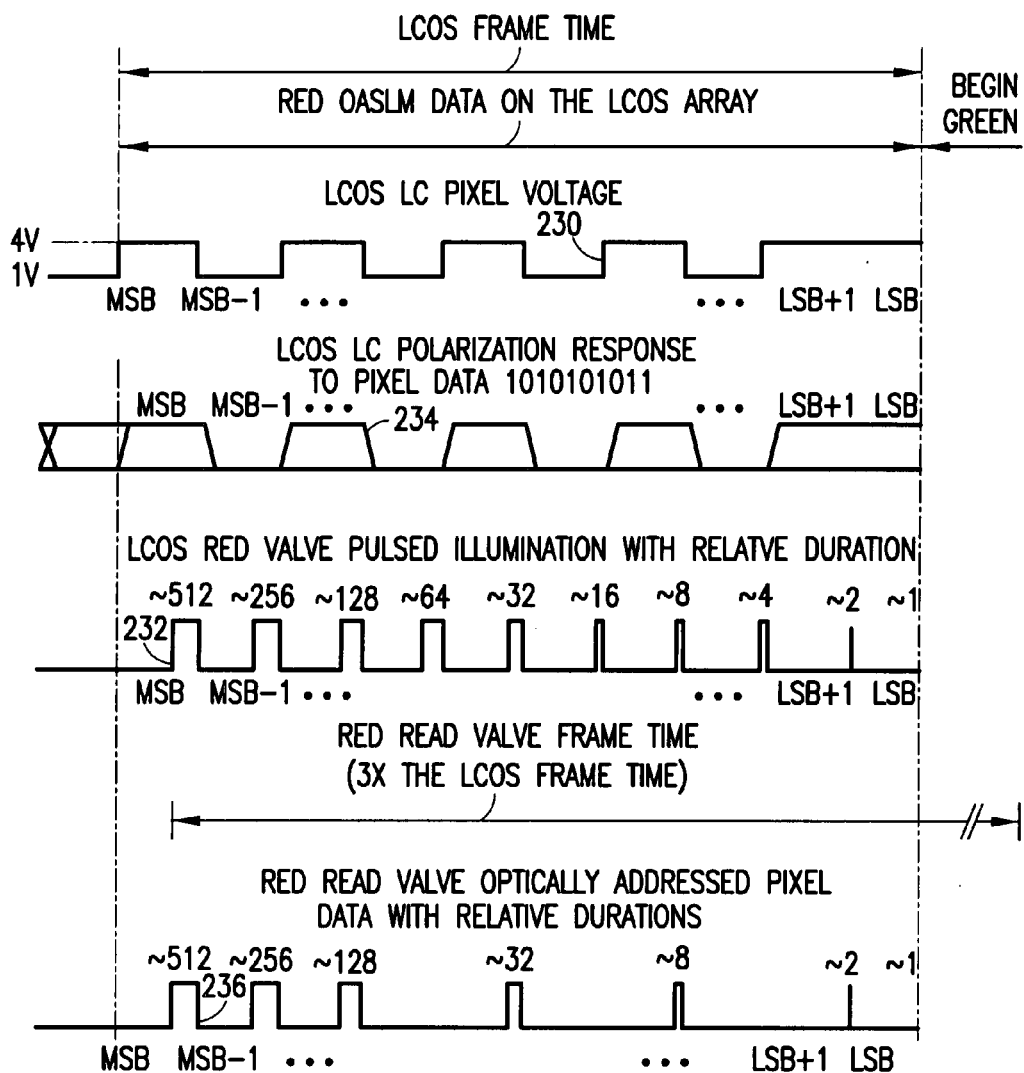
FIG. 8 is a set of timing diagrams associated with gray scale modulation of an LCOS microdisplay illuminated with spaced-apart light pulses with different pulse widths.

FIG. 8 shows a delayed LCOS pulsed illumination method, in which the LED amplitude of the LCOS illumination 232 is held constant and the LED individual pulse widths are varied. The frame period is divided into ten pixel voltage data periods 230. The LCOS illumination 232 pulse width varies with the datum bit being presented to the LCOS microdisplay. The approximate relative pulse widths are as indicated in FIG. 8. The combination of bit position in the frame time and the illumination pulse widths provides the binary weight photoreceptor voltage levels. The illumination scheme shown in FIG. 8 is pulsed after the liquid crystal material response 234 is stable so that each bit has an impact independent of the liquid crystal material response. The pixel liquid crystal material response for the pixel bit sequence 1010101011 is shown as 234, and the resulting illumination pattern produced by the LCOS for the pixel data bit sequence is shown as read valve optically addressed pixel data 236.

As with the method of FIG. 7, the liquid crystal material responses 234 in FIG. 8 are shown as trapezoidal. Again, in practice the rising and falling edges are S-shaped for ferroelectric liquid crystal materials or exhibit exponential decay for nematic liquid crystal materials. However, because the method of FIG. 8 does not pulse the LED until the LCOS response has stabilized, and because LED rise and fall times are essentially instantaneous, any errors resulting from the LCOS rise and fall times are avoided and monotonic gray scale response behavior can be expected. Also as with the method of FIG. 7, in practice the frame periods of the three read valves are each shifted by ⅓ frame time in order to allow the LCOS modulation to occur near the beginning of each read valve frame. This minimizes the illumination levels and OASLM voltages required.

Another possible limitation of the LCOS driving method shown in FIG. 7 is that the OASLM photoreceptor voltage may need to be higher due to the LCOS rise time than if the impact of the LCOS response times were avoided. As shown in FIG. 8, it would be preferable to present the LCOS MSB data prior to the beginning of the read valve frame period for LCOS response stabilization and start of fully weighted illumination.

The method shown in FIG. 8 operates LED 105 at a relatively low duty cycle, since LED 105 must be turned off for both the time taken to load the bit plane data and the time required for the liquid crystal material of LCOS device 112 to respond to the bit plane data. In a projection system of a type described with reference to OASLM 100, the total of these two times can exceed 400 microseconds. For ten pulses, this becomes 4 milliseconds. If there are only 5.56 milliseconds total available for addressing the cell (frame sequential operation), then only 1.5 milliseconds are left for pulsing LED 105. This may require fairly high peak LED power to achieve sufficient photoreceptor charge integration.

This method also allows the data to be written to the pixel at a more or less even rate. To allow more time for the more significant illumination pulses, the time between the lower significant bit pixel data may be shortened as less time is needed for the LED illumination pulses. Another variation would allow less time for LC stabilization with the lesser significant bits than the most significant. For example, the error allocated to LC stabilization for an associated bit exposure may be binary weighted.

Figure 9:
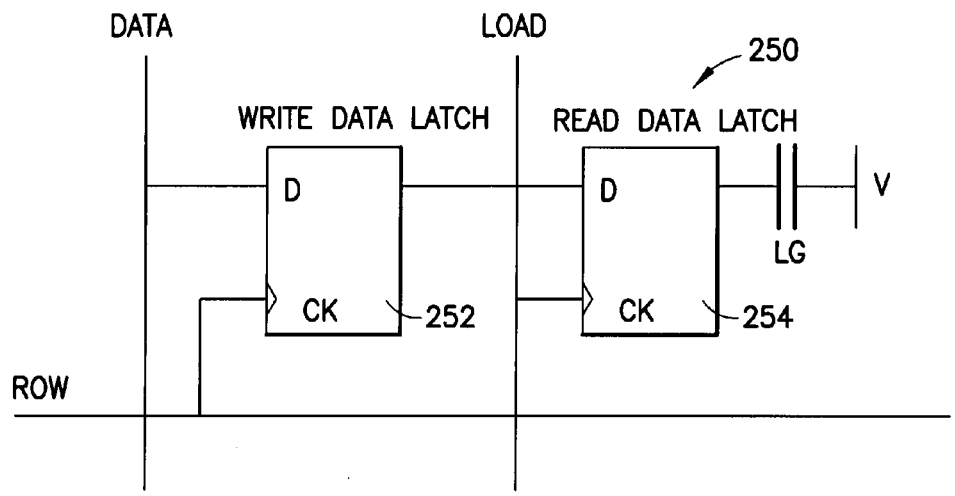
FIG. 9 is a logic circuit diagram of a digital backplane pixel circuit composed of a write data latch and a read data latch.

FIG. 9 is a logic circuit diagram of a digital backplane pixel circuit 250 that implements a variation on the pulsed illumination method shown in FIG. 8. Pixel circuit 250 includes a write data latch 252 and a read data latch 254. A Row signal is set high to write the column line Data into the write data latch 252. After the Row signal is set low, the data remains in the write data latch. A Load signal is applied to the read data latch to pass the data on the output of the write data latch 252 into the read data latch 254. The Load signal is connected to all the pixel circuits in the LCOS array which allows simultaneous presentation of the array pixel data to the liquid crystal. After the Load signal is set low, the data remains in the read data latch. Construction of each data latch may be as simple as a pass gate (one or two transistors) and if needed an inverter (two transistors).

Pixel circuit 250 allows writing the image plane data to the array of pixels of LCOS device 112 in a nearly continuous manner. For example, the time for writing the MSB bit of data to all the pixels in the pixel array can take as long as the liquids crystal response time and the LED pulse width periods. This reduces the bandwidth of LCOS device 112. Alternatively, this method can be used to increase the duty cycle of LED 105 and thereby lowering the peak LED power required.

The discussion above relating to FIGS. 7 and 8 assumes that the frame time of LCOS device 112 is divided into ten (or twenty) equal write data periods. In practice, there is a significant advantage if the entire ten-pulse modulation scheme can be completed in the first half of the LCOS frame time. This is so because imparting earlier all of the energy of LED 105 to the photoreceptor of OASLM 144 increases the effectiveness of time weighting and reduces the peak-to-average voltage ratio across the OASLM liquid crystal and OASLM photoreceptor liquid crystal sandwich. Reducing the peak-to-average voltage ratio in turn makes the photoreceptor easier to design. However, concentrating all of the illumination pulses in the first part of the frame places a limitation on the longest possible illumination pulse width of LED 105.

For example, if a 2.78 ms frame time is divided into ten equal subframes, each subframe becomes 278 microseconds long. If the settling time of the liquid crystal material of LCOS device 112 is 200 microseconds, using the disclosed scheme, the longest possible illumination pulse of LED 105 is 78 microseconds. It can be difficult to impart enough illumination for the MSB, MSB-1, and MSB-2 bit weights in this amount of time. The solution to this problem lies in the fact that the lower-weight bits actually require much shorter illumination pulses of LED 105 and, therefore, do not need the full 78 microseconds. Thus, the time slots for the lower-weight bits can be shortened, typically to just over 200 microseconds, and the time saved can be used to lengthen the illumination pulses of LED 105 for the upperweight bits. The table below presents an example of bits and relative times for a ten-pulse modulation scheme implementing variable write data periods.

| Bit # | Bit Weight | LED Pulse Width (microseconds) |
|---|---|---|
| B9 | 512 | 336 |
| B8 | 256 | 172 |
| B7 | 128 | 88 |
| B6 | 64 | 45 |
| B5 | 32 | 23 |
| B4 | 16 | 11 |
| B3 | 8 | 6 |
| B2 | 4 | 3 |
| B1 | 2 | 1.5 |
| B0 | 0 | 0.75 |

Figure 10:
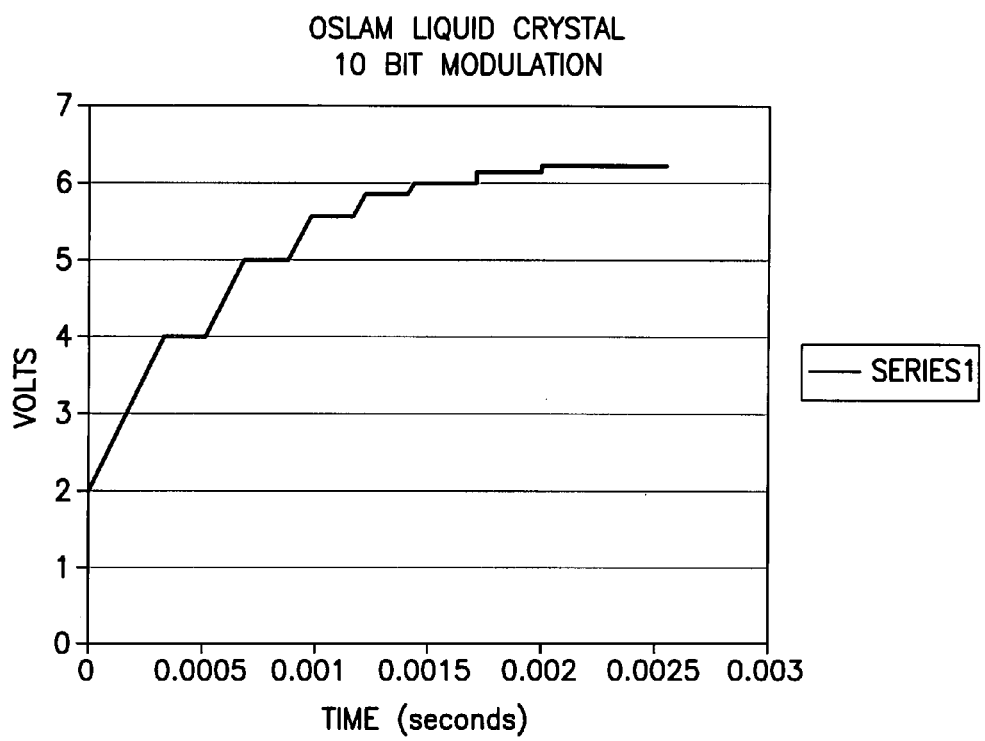
FIG. 10 is a graph showing local photoreceptor voltages produced by LCOS binary-weighted illumination pulse widths for the case in which the gray scale data packet is (1111111111).

FIG. 10 is a graph showing the theoretical read valve liquid crystal voltage waveform produced by the LED timing set out in the table above for a modeled photoreceptor-liquid crystal combination of SLM 144. (The initial 2V value results from the capacitive divider effect of the drive waveform on the photoreceptor and liquid crystal layer combination.)

Figure 11:
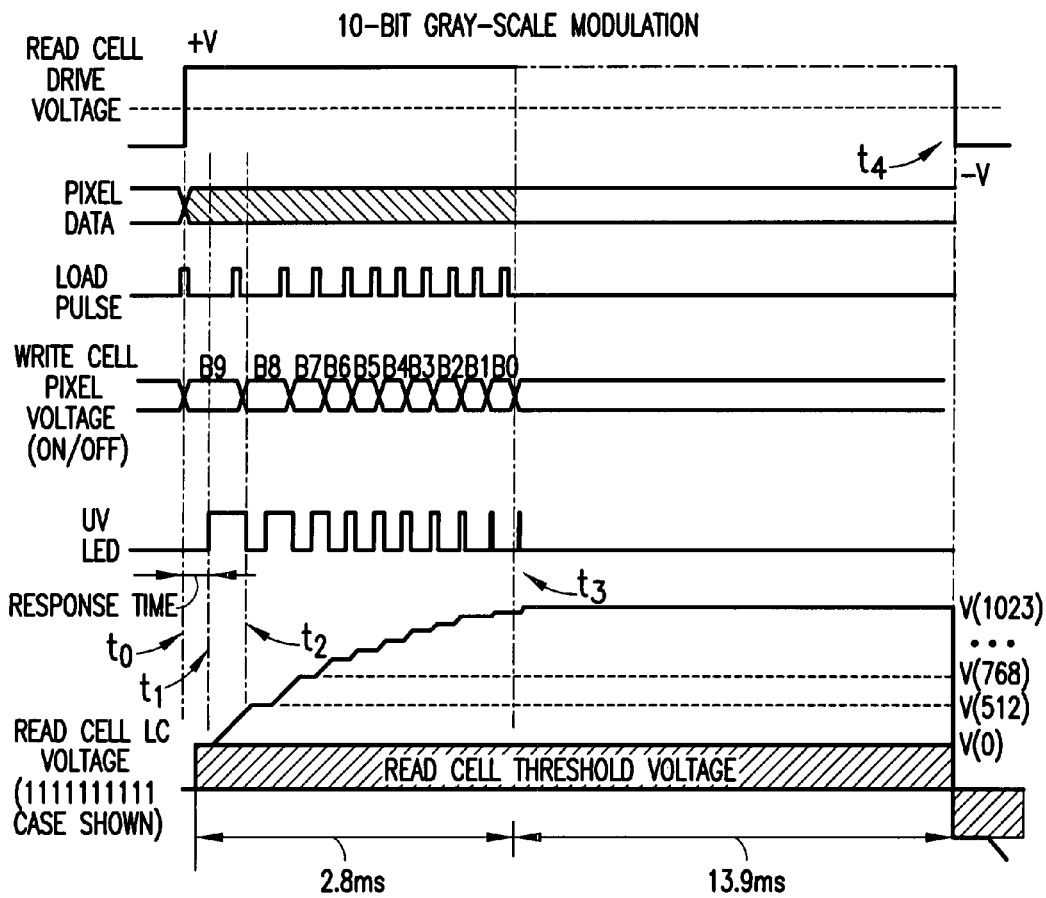
FIG. 11 is a summary timing diagram showing the modulation waveforms for one pixel of an LCOS device and its corresponding pixel location on an associated spatial light modulator.

FIG. 11 is a summary timing diagram showing the modulation waveforms for one read valve OASLM in an entire frame of an embodiment implemented to solve the technical and performance problems discussed above. The following describes the operation of 10-bit gray scale modulation with reference to OASLM 100 of FIG. 5.

With reference to FIGS. 5 and 11, there are 10 bits in the exemplary gray scale sequence depicted. During each frame period, the image bit plane data are written 10 times, once for each gray level so that at the end of the 10-bit sequence, each pixel has its gray scale combination of ten weighted values to provide a unique gray level for that pixel. The following description traces through the 10-bit gray scale modulation of one pixel of LCOS device 112 and its corresponding pixel location of SLM 144.

At time t0, controller 114 causes application of a Load signal to read data latch 254 of backplane pixel circuit 250 (FIG. 9) to simultaneously load into it an image plane pixel datum B9 (MSB) from pixel write data latch 252 (FIG. 9). The data was written into latch 252 at the end of the previous frame (not shown).

At time t0, controller 114 causes application of a read cell Drive Voltage across the photoreceptor-liquid crystal layers of OASLM 114, which in response undergo a transition from −Volts to +Volts at time t1 to start the 16.7 ms frame period.

The liquid crystal directors at the pixel location of LCOS device 112 respond to the logic state of pixel datum B9 to produce a corresponding On/Off Write Cell Pixel Voltage at the pixel location. The liquid crystal directors of the pixel take an amount of time to reach a stable state corresponding to the Write Cell Pixel Voltage, shown as "Response Time" at FIG. 11. After the response time delay, controller 114 causes UV LED 105 to emit an illumination pulse of specified width for incidence on LCOS device 112. This is shown as time t1 in that Figure. UV light-carrying MSB image information of the pixel propagates from LCOS device 112 and reflects off dichroic mirror 142 to direct the UV light along write path 102 for incidence on OASLM 144. The photoreceptor-liquid crystal layers of read valve OASLM 144 respond to localized incident UV light which generates charge and creates a localized LC voltage that corresponds to the optical power of the UV LED illumination pulse and Write Cell Pixel Voltage for pixel datum B9. The Read Cell LC voltage integration continues until time t2, when the illumination pulse corresponding to datum B9 ends. The process described above continues with the appearance of a Load signal for each of pixel data B8-B0.

The time intervals separating next adjacent Load signal differ and the pulse widths of UV LED illumination pulses progressively decrease in synchronism for the reasons described above with reference to FIG. 8 and the LED pulse width table. UV light pulses corresponding to the bit plane data for all 10 bits are completed at time t3, 2.8 ms into the frame period. The Read Cell LC Voltage stabilizes at a corresponding gray scale value at time t3 and remains there throughout the rest of the frame period. This process holds true for each pixel of LCOS device 112 and its corresponding pixel location on read valve OASLM 144.

During the entire frame period, which lasts from time t1 to time t4, visible polarized light propagating along read path 104 and incident on OASLM 144 undergoes at each pixel location polarization rotation corresponding to Read Cell LC Voltage. This produces a gray scale image response of the visible light for display.

In order to assure a substantially monotonic gray scale response in the OASLM system, it is necessary to characterize the write light illumination characteristics (rise/fall time, output with bit plane weights/timing in sequential operation and temperature characteristics) write valve LC response (rise/fall times, optical throughput and contrast) and the read valve modulation response to the timing and weights of the write valve images (optical throughput, optical sensitivity, optical isolation between write and read illumination and response times). It may be necessary to characterize the read valve modulation response at each read valve pixel location if there are significant local variations in the read valve response. The controller 114 comprising of a field programmable gated array FPGA or an application specific integrated circuit ASIC may use a factory determined read valve pixel calibration data or generate a control sequence or test pattern to obtain the pixel calibration data over time for scaling the LCOS device pixel data to produce uniform pixel to pixel read valve response.

Ultimately in the process of implementing the embodiments, one must make a series of choices for LED pulse timing, durations, and currents in order to implement digital gray-scale modulation of an OASLM as described in the previous discussion. A number of approaches, or methods, have been described both here and in the literature, which provide rationales for making these choices.

Clearly, in practice one will find that some of these methods produce better results than others in terms of achieving smoothly-varying monotonic gray-scale modulation, and generally one will use whichever method is predicted to give the best result. However, when these algorithms are applied to real physical systems, such as an OASLM light engine used in a rear projection television RPTV, it is common to observe that the actual measured gray-scale transfer function (EO-curve) significantly differs from the predicted result. The variation can have many causes, including:

Nonlinearity(s) in the integrating characteristic of the OASLM

Asymmetries in the integrating characteristic of the OASLM

Response time variations in the write-valve liquid crystal materials

Variations in the contrast (on-to-off ratio) of the write-valve

Non-ideal switching characteristics of the write-valve, particularly as a function of temperature Timing or current control errors in the write-valve illumination LED.

The referenced disclosure mentions a strategy for dealing with this variability. This strategy is to measure the EO-curve of the target system, using one of the gray-scale modulation methods of choice. One then constructs an ideal transfer function of the desired bit-depth, shape and Gamma. Finally, for each point on the ideal transfer function one chooses the value from the measured EO-curve that is closest to the ideal transfer function at that point. These choices are recorded in a lookup-table, which is then implemented in the system electronics. For this to work properly, it is important that the original EO-curve have a significantly higher bit-depth than the desired system EO curve, to allow plentiful choices for each point on the desired EO-curve. In principle this strategy can result in a near-perfect system EO-curve even if the results of the original gray-scale modulation algorithm are highly non-ideal.

Figure 12:
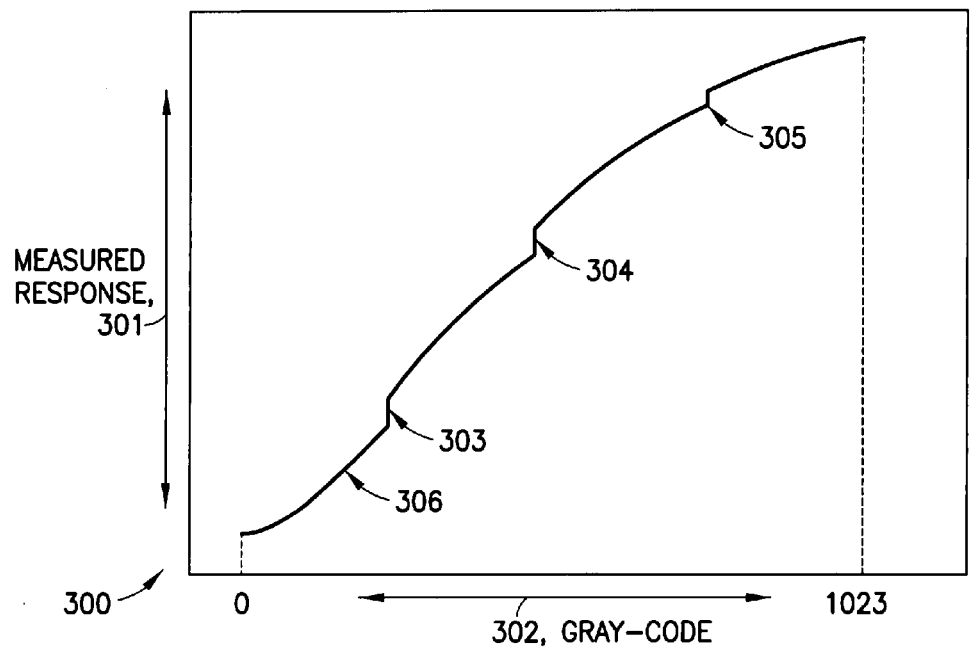
FIG. 12 is a graph of a measured grey-scale transfer function or EO curve showing non-monotonic jumps between the MSB and MSB-1 bits.

However, this strategy does not work if the measured EO-curve contains any significant positive-polarity jumps, or gaps. FIG. 12 shows such a measured EO curve 306. Here 300 is the graph, 301 is the measured electro-optical response, and 302 is the input gray-code. Here we have three significant jumps at the points marked 303, 304, and 305. In this example 304 is associated with an error in the MSB pulse/pulse response, and points 303 and 305 probably correspond to an error in the response associated with the MSB-1 bit. This is a typical kind of error to expect, in which the effective sum of the lower bits does not quite equal the weight of the next larger bit. This EO-curve cannot be sorted into a smoothly-varying EO-curve regardless of the look-up choices made, since there are no available data points in the gaps to choose from. Thus, some choices for initial modulation algorithms may not give useable results because these gaps are large enough to create objectionable visual artifacts.

In order to avoid these unproductive choices, the following strategy is useful. Instead of making choices for pulse timing, width, and current that are predicted to give the desired EO-curve, choices are made which are expected to give a deliberately non-ideal EO-curve with non-monotonic jumps at some or all of the "bit carry's". (Bit carry's for a 10-bit system as described above are the transitions from 511-512, 255-256, 127-128, 63-64, 31-32, 15-16, 7-8, 3-4, and a trivial one at 1-2.) By creating this deliberately non-monotonic EO-curve, it can be assured that the sorting strategy previously described will always work, even if system variations result in considerable departure of the measured response from the original predicted response.

The method for generating the pulse timing, width, and currents to achieve this deliberately non-ideal EO-curve is as follows. Note that implementing this, or any other similar method, requires the use of an effective simulation tool, which can calculate the predicted integrated effect of various pulse timing, duration, and pulse current schemes. It is fairly straight-forward to create such tools using any of a number of programming languages, and the usefulness of such a tool is obvious.

First, an initial set of pulse timing, width and currents are chosen using any of the previously-disclosed methods which should result in a full-scale value of approximately 50% higher than what is actually desired. (This value of 50% is to correct for the cumulative effects of the adjustments described in the following steps. The 50% number is approximately appropriate for the case described here. Other values may be used depending on the particular choices made.)

Starting with the LSB+1, we make the effective weight of each successively higher bit about 10% less than the sum of the bit weights of the bits below that one.

This is repeated for each successively-higher bit, ending with the MSB. Thus, the effective weight chosen for the MSB will be 90% of the predicted weights of the sum of all the lower bits, or alternately we can say that the digital weight given to the 512-value pulse is 90% of the digital weights of the pulses which combine to create the 511-value.

In practice, adjustments of other than 10% of course can be used. Often 5% will be enough. Also, again in practice this adjustment may only need to be applied to a few of the most-significant bits, since these are most likely to be seriously impacted by the variations noted above.

If necessary, the entire above sequence can be repeated, using different initial conditions until a desired full-scale response and the desired non-monotonic bit carries are achieved.

Figure 13:
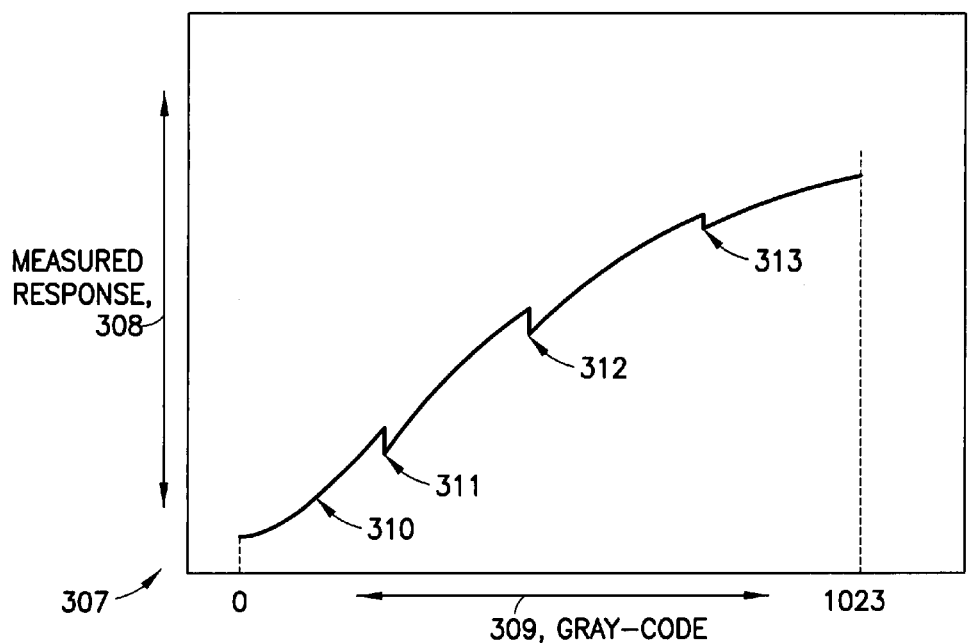
FIG. 13 is an EO-curve modified from that of FIG. 12 to fit the data to the desired response shape.

FIG. 13 shows the EO-curve (310), which would result from modifying the original algorithm of FIG. 12. For clarity, only the transitions associated with the MSB and MSB-1 are shown. Note the non-monotonic jumps at the values of 256 (311), 512 (312), and 768 (313). It is clear that this EO-curve can be sorted to create a smoothly-varying response, and that there are always either 1 or 2 values to choose from for any desired measured response.

Figure 14:
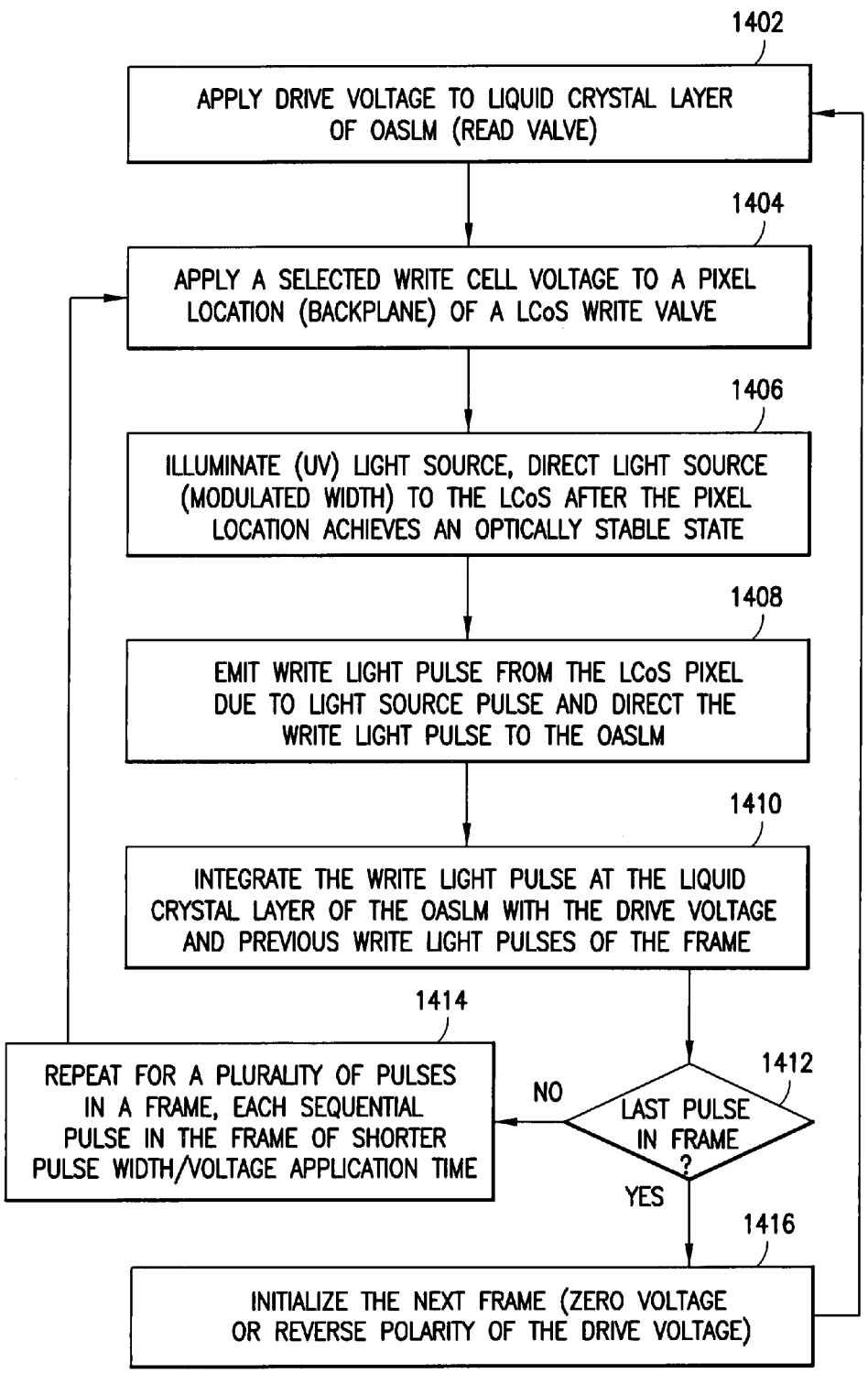
FIG. 14 is a flow diagram outlining method steps in accordance with an exemplary embodiment of the invention.

FIG. 14 shows an exemplary method for arranging the write light to the OASLM 144. At block 1402, a drive voltage is applied to an electro-optic (liquid crystal) layer of the OASLM read valve. This drive voltage is held for the duration of the frame. At block 1404, a selected write voltage is applied to a pixel location of a LCoS write valve. This pixel voltage is allowed to stabilize. At block 1406 a light source/UV LED is illuminated and directed to the (front plane) electro-optic layer of the LCoS. Note that the light source illumination of the LCoS is only after the LCoS reaches an optically stable state. This is most simply done by imposing a response time delay between the time the controller applies the voltage and the time the controller modulates the light source to ON for the same pulse. The actual value of the time delay required depends on the write-valve liquid crystal formulation and on the liquid crystal temperature. For ferroelectric liquid crystals this time delay can be between 100 and 200 microseconds. For vertically-aligned nematic crystals and thin cell gaps values of 200 to 250 microseconds have been demonstrated. Planar-aligned magnetic liquid crystal materials require typically 250 to 500 microseconds, with other types of liquid crystal formulations such as twisted-nematic being all substantially slower. While these time delays, particularly the ones associated with the ferroelectric and vertically-aligned materials, seem quite short, they are important to assure monotonic behavior in the read valve.

Returning to FIG. 14, since the pixel at the LCoS has the selected write voltage applied, the light from the source causes a write light pulse to be emitted from the LCoS at block 1408, which is directed to a localized area of the OASLM. At block 1410, a voltage develops at the LC layer of the OASLM proportional to the integrated write light pulse incident upon that layer and the amplitude of the drive voltage. For later write light pulses in the frame, the additional write light pulses cause additional integrated voltage increases from the previous voltages in the frame due to previous write light pulses.

Across the frame, the gaps between applying the individual voltages for the bits of different significance is constant as seen in the timing diagrams of FIGS. 7, 8 and 11, or at least exceeds in each instance a predetermined value. So long as this is not the last pulse in the frame (the LSB) at block 1412, then blocks 1404, 1406, 1408 and 1410 are repeated for each successive bit (block 1414), from MSB to LSB so that the more significant bits are presented earlier in the frame and integrated over a longer period for a higher bit weighting as previously described. Additional weighting is by modulation: pulse width (the time the light source is illuminated and the time during which the selected write cell voltage is applied); pulse amplitude (optical power of the source light and/or the level of the applied write cell voltage); duty cycle; or some combination thereof as detailed above. This is possible because the same controller 114 directs both the LCoS backplane/write cell voltage application and the light source itself.

Once the last pulse in the frame has been emitted as a write light pulse to the OASLM, then block 1412 leads to block 1416 where the next frame of the OASLM is initialized, such as by a brief zero-voltage period or by reversing polarity of the drive voltage. Note that the OASLM frame initialization need not follow immediately after the last write light pulse is written and integrated. As detailed above, it is advantageous to constrain all of the write light pulses within the first portion or first half of the frame, so long as the pulse widths can still properly apply the appropriate bit weights. In that instance, initialization is not done until the end of the frame even though further write light pulses are not sent in the second half of the frame, as seen at FIG. 11 at time t4. Also, where a single optical write valve writes to three different optical read valves, the OASLM frame is approximately three times the length of the write valve frame, and is initialized in those embodiments only after three write frames are written. The response time of the liquid crystal layer in the OASLM read valve is generally slow, typically comparable to or greater than the (read valve) frame time. As such, the readout signal represents an RMS value of the voltage that is optically induced on the crystal. The OASLM is 'read-out' continuously rather than discretely, and the resulting modulation there may be considered an average modulation to the desired gray scale level.

The embodiments of this invention may be implemented by computer software executable by a data processor such as the controller 114 shown, or by hardware circuitry, or by a combination of software and hardware circuitry. Further in this regard it should be noted that the various blocks of the logic flow diagram of FIG. 14 may represent program steps, or interconnected logic circuits, blocks and functions, or a combination of program steps and logic circuits, blocks and functions for performing the specified tasks.

Clearly this general method should be interpreted to include reasonable variations on this concept, including applying the adjustments to any subset, or all of the individual bits, applying varying adjustments to each bit, using additive instead of multiplicative adjustments, etc. Although described in the context of particular embodiments, it will be apparent to those skilled in the art that a number of modifications and various changes to these teachings may occur. For example, while specific details have been presented in the context of 10-bit gray scale resolution, these teachings can be readily extended to different resolution, such as 8 bits, 12 bits, 14 bits, etc. Thus, while the invention has been particularly shown and described with respect to one or more embodiments thereof, it will be understood by those skilled in the art that certain modifications or changes may be made therein without departing from the scope and spirit of the invention as set forth above, or from the scope of the ensuing claims.

We claim:

1. A method of optically writing to an optical read light valve comprising:

applying a plurality of selected write cell voltages at a pixel location of an optical write light valve during a frame interval;

after the pixel location achieves an optically stable state for each of the selected write cell voltages, modulating a write light source to illuminate the pixel location so as to emit from the pixel location write light pulses;

directing the write light pulses to a localized portion of an electro-optic layer of an optical read light valve; and sequentially repeating the applying, modulating, and directing for a plurality of selected write cell voltages over subsequent frame intervals, wherein a resulting modulation of the electro-optic layer of the optical read light valve is a monotonic function based on the combined intensity and duration of the write light pulses during a given frame interval.

2. The method of claim 1, further comprising, for the duration of the frame interval, applying a drive voltage to the electro-optic layer of the optical read light valve and integrating, at the localized portion of the optical read light valve over the frame, voltages corresponding to optical powers of the write light pulses.

3. The method of claim 1, wherein modulating a write light source further comprises imposing a response time delay after first applying each of the selected write cell voltages.

4. The method of claim 3, wherein the response time delay is constant for each of the plurality of selected write cell voltages.

5. The method of claim 1, wherein the write light source is modulated in pulse width.

6. The method of claim 5, wherein each of the selected write cell voltages is applied for a duration of time approximately equal to the time it takes for the pixel location to achieve the optically stable state plus the time that the pixel location is illuminated with the respective pulse-width modulated light source pulse.

7. The method of claim 1, wherein the write light source is modulated in pulse amplitude or duty cycle.

8. The method of claim 1, wherein applying one of the plurality of selected write cell voltages comprises applying an ON write cell pixel voltage to a first backplane data latch of the optical write light valve and subsequently at a selected time transferring the ON write cell pixel voltage to a second data latch whose output is coupled to an electrode defining the pixel location.

9. The method of claim 8, wherein the optical write light valve comprises a liquid crystal on silicon device and the write light source comprises a light emitting diode or a laser diode emitting at a wavelength seen as monochromatic at the optical write light valve.

10. The method of claim 1, wherein the sequentially applied selected write cell voltages are applied for a duration of the frame interval.

11. The method of claim 1, wherein the sequentially applied selected write cell voltages are constrained to within a first half of the frame interval.

12. The method of claim 1, wherein directing the write light pulse comprises directing the write light pulse to a localized portion of an electro-optic layer of three optical read light valves, and wherein the frame interval is a write cell frame that is approximately one third the length of a frame of the optical read light valves.

13. An optical write light valve comprising:

an electro-optic layer;

a backplane defining pixel locations of the electro-optic layer;

a light source arranged in optical communication with the electro-optical layer;

a controller coupled to a memory and adapted during a frame interval to sequentially and discontinuously apply a plurality of selected write cell voltages at a pixel location of the optical write light valve, and after the pixel location achieves an optically stable state for each of the applied write cell voltages, to modulate the light source to illuminate the pixel location; and an optical read light valve in optical communication with the electro-optic layer of the optical write light valve, wherein the controller is further adapted to apply, for the duration of the frame interval, a drive voltage to an electro-optic layer of the optical read light valve, and wherein a resulting modulation of the electro-optic layer of the optical read light valve is a monotonic function based on the combined intensity and duration of the write light pulses during a given frame interval.

14. The optical write light valve of claim 13, wherein the controller is adapted to modulate the light source after the pixel location achieves an optically stable state by imposing a response time delay after first applying each of the selected write cell voltages.

15. The optical write light valve of claim 14, wherein the response time delay is constant for each of the selected write cell voltages.

16. The optical write light valve of claim 13, wherein the controller modulates a light source pulse width.

17. The optical write light valve of claim 16, wherein each of the selected write cell voltages is applied for a duration of time approximately equal to the time it takes for the pixel location to achieve the optically stable state plus the time that the pixel location is illuminated with the respective pulse-width modulated light source pulse.

18. The optical write light valve of claim 13, wherein the light source is modulated in pulse amplitude or duty cycle.

19. The optical write light valve of claim 13, wherein the backplane further comprises a first and a second data latch, and wherein the controller is adapted to apply each of the selected write cell voltages by applying an ON write cell pixel voltage at the first data latch and subsequently at a selected time to transfer the ON write cell voltage to the second data latch whose output is coupled to an electrode defining the pixel location.

20. The optical write light valve of claim 19, wherein the optical write light valve comprises a liquid crystal on silicon device and the modulated light source comprises a light emitting diode or a laser diode emitting at a wavelength seen as monochromatic at the optical write light valve.

21. The optical write light valve of claim 13, wherein the plurality of selected write cell voltages are applied for a duration equivalent to the frame interval.

22. The optical write light valve of claim 13, wherein the plurality of selected write cell voltages are applied so as to be constrained to within a first half of the frame interval.

23. A method for driving a projection system having a controller coupled to a memory and directed toward emitting optical write light, the method comprising:

applying a plurality of selected write cell voltages at a pixel location of an optical write light valve during a frame interval;

after the pixel location achieves an optically stable state for each of the selected write cell voltages, modulating a light source to illuminate the pixel location so as to emit from the pixel location write light pulses;

directing the write light pulses to a localized portion of an electro-optic layer of an optical read light valve; and sequentially repeating the applying, modulating, and directing for a plurality of selected write cell voltages over subsequent frame intervals, wherein a resulting modulation of the electro-optic layer of the optical read light valve is a monotonic function based on the combined intensity and duration of the write light pulses during a given frame interval.

24. The method of claim 23, further comprising, for the duration of the frame interval, applying a drive voltage to the electro-optic layer of the optical read light valve and integrating, at the localized portion of the optical read light valve over the frame, voltages corresponding to optical powers of the write light pulses.

25. The method of claim 23, wherein modulating a light source further comprises imposing a response time delay after first applying each of the selected write cell voltages.

26. The method of claim 23, wherein the response time delay is constant for each of the plurality of selected write cell voltages.

27. The method of claim 23, wherein the light source is modulated in pulse width.

28. The method of claim 27, wherein each of the selected write cell voltages is applied for a duration of time approximately equal to the time it takes for the pixel location to achieve the optically stable state plus the time that the pixel location is illuminated with the respective pulse-width modulated light source pulse.

29. The method of claim 23, wherein the light source is modulated in pulse amplitude or duty cycle.

30. The method of claim 23, wherein applying the selected write cell voltage comprises applying an ON write cell pixel voltage at a first backplane data latch of the optical write light valve and subsequently at a selected time transferring the ON write cell pixel voltage to a second data latch whose output is coupled to an electrode defining the pixel location.

31. The method of claim 23, wherein the sequentially applied selected write cell voltages are applied for a duration equivalent to the frame interval.

32. The method of claim 23, wherein the sequentially applied selected write cell voltages are constrained to within a first half of the frame interval.

33. A method of optically writing to a read light valve comprising:

applying a plurality of selected write cell voltages at a pixel location of an optical write valve during a frame interval;

after the pixel location achieves an optically stable state for each of the selected write cell voltages, illuminating the pixel location with modulated light source pulses during the frame interval so as to emit from the pixel location write light pulses;

directing the write light pulses to a localized portion of an electro-optic layer of an optical read light valve; and sequentially repeating the applying, illuminating, and directing for a plurality of selected write cell voltages and modulated light source pulses over subsequent frame intervals, wherein a resulting modulation of the electro-optic layer of the optical read light valve is a monotonic function based on the combined intensity and duration of the write light pulses during a given frame interval.

* * * * *